United States Patent
Ishihara

(10) Patent No.: US 9,546,622 B2
(45) Date of Patent: Jan. 17, 2017

(54) INTAKE CONTROL DEVICE

(71) Applicant: AISIN SEIKI KABUSHIKI KAISHA, Kariya-shi (JP)

(72) Inventor: Hiromitsu Ishihara, Okazaki (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 137 days.

(21) Appl. No.: 14/403,872

(22) PCT Filed: May 30, 2013

(86) PCT No.: PCT/JP2013/065053
§ 371 (c)(1),
(2) Date: Nov. 25, 2014

(87) PCT Pub. No.: WO2013/187241
PCT Pub. Date: Dec. 19, 2013

(65) Prior Publication Data
US 2015/0136055 A1  May 21, 2015

(30) Foreign Application Priority Data

Jun. 11, 2012 (JP) ................. 2012-132187

(51) Int. Cl.
*F02M 35/10* (2006.01)
*F02D 41/00* (2006.01)
(Continued)

(52) U.S. Cl.
CPC ........ *F02M 35/10255* (2013.01); *F02B 31/06* (2013.01); *F02D 9/1025* (2013.01);
(Continued)

(58) Field of Classification Search
CPC ............. F02M 35/10255; F02M 35/10085; F02M 35/10288; F02M 11/02; F02M 35/10262; F02M 35/104; F02M 35/10295; F02M 35/10386; F02D 9/1095; F02D 9/1065; F02D 9/12; F02D 9/1035; F02D 41/0002; F02D 2009/024; F02D 2041/0015
(Continued)

(56) References Cited

U.S. PATENT DOCUMENTS 6,761,140 B2   7/2004  Herold et al.
8,171,913 B2 * 5/2012  Sano ................. F02D 9/02
                                               123/184.56
(Continued)

FOREIGN PATENT DOCUMENTS

DE    202007013151 U1   2/2009
DE  10 2009 054 184 A1   5/2011
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Dec. 24, 2014, by the International Bureau of WIPO in corresponding International Application No. PCT/JP2013/065053. (6 pages).
(Continued)

*Primary Examiner* — Long T Tran
(74) *Attorney, Agent, or Firm* — Buchanan Ingersoll & Rooney PC

(57) ABSTRACT

The present invention provides an intake control device that appropriately restricts the flow of intake air when a valve body is set to a restriction position while the valve body is smoothly operated. The valve body is configured such that it is supported so as to be capable of swinging with respect to a sleeve, and when the valve body is set to the restriction position, a main valve portion of the valve body is lifted
(Continued)

upward from a bottom plate, and a secondary valve portion of the valve body is sunk into an accommodating space of the bottom plate. In the accommodating space, a stepped portion that allows outward displacement from an inner surface of the sleeve is formed, and a seal portion that is brought closer to the stepped portion when the valve body is set to the restriction position is formed in the secondary valve portion.

5 Claims, 6 Drawing Sheets

(51) Int. Cl.
F02M 35/112 (2006.01)
F02B 31/06 (2006.01)
F02D 9/16 (2006.01)
F02M 35/104 (2006.01)
F02D 9/10 (2006.01)

(52) U.S. Cl.
CPC .............. *F02D 9/16* (2013.01); *F02M 35/104* (2013.01); *F02M 35/10085* (2013.01); *F02M 35/112* (2013.01); *F02B 2275/48* (2013.01); *F02D 41/0002* (2013.01); *F02D 2041/0015* (2013.01); *F02M 35/10321* (2013.01); *Y02T 10/125* (2013.01); *Y02T 10/146* (2013.01); *Y02T 10/42* (2013.01)

(58) Field of Classification Search
USPC ........................................ 123/184.21–184.61
See application file for complete search history.

(56) References Cited

U.S. PATENT DOCUMENTS

| | | | |
|---|---|---|---|
| 2009/0164097 A1* | 6/2009 | Uda ........................ | F02B 31/08 701/103 |
| 2009/0164098 A1* | 6/2009 | Uda ........................ | F02B 31/08 701/103 |
| 2010/0006053 A1* | 1/2010 | Kondo .................... | F02B 31/06 123/184.56 |
| 2010/0037853 A1* | 2/2010 | Tsuchiya ................. | F02B 31/06 123/306 |
| 2010/0122680 A1* | 5/2010 | Sano ...................... | F02D 9/103 123/184.56 |
| 2011/0107995 A1 | 5/2011 | Takeda et al. | |
| 2012/0312275 A1 | 12/2012 | Eisele et al. | |

FOREIGN PATENT DOCUMENTS

| | | |
|---|---|---|
| JP | 2004-526098 A | 8/2004 |
| JP | 2007-192147 A | 8/2007 |
| JP | 2011-102575 A | 5/2011 |
| JP | 2011-231688 A | 11/2011 |
| WO | WO 2011/061247 A1 | 5/2011 |

OTHER PUBLICATIONS

International Search Report (PCT/ISA/210) mailed on Jul. 30, 2013, by the Japanese Patent Office as the International Searching Authority for International Application No. PCT/JP2013/065053.
Written Opinion (PCT/ISA/237) mailed on Jul. 30, 2013, by the Japanese Patent Office as the International Searching Authority for International Application No. PCT/JP2013/065053.

* cited by examiner

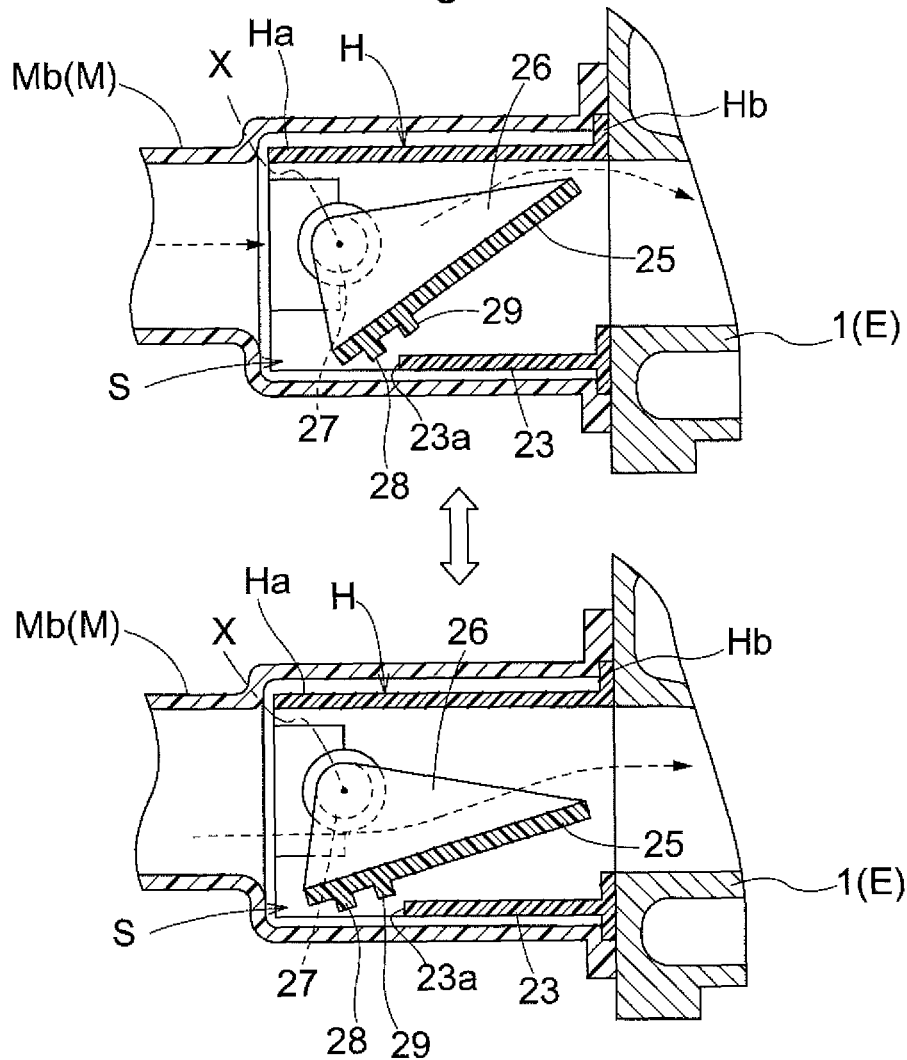
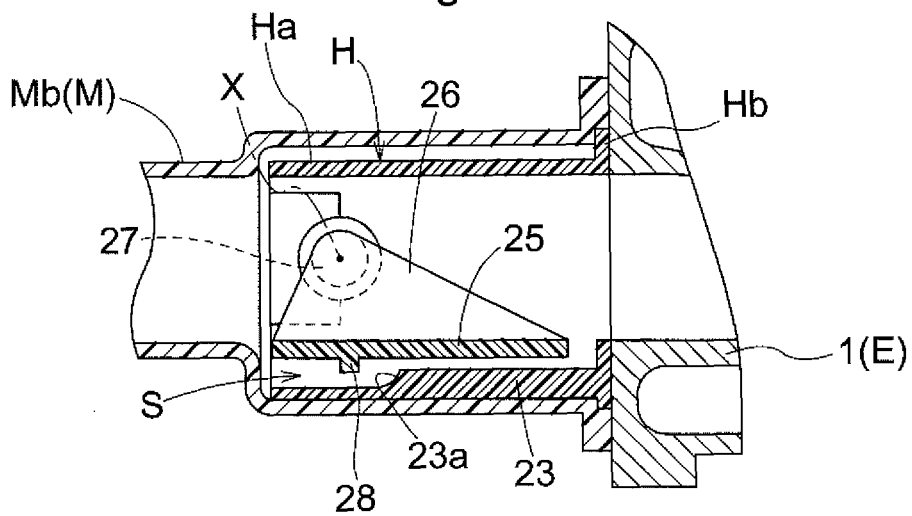

INTAKE CONTROL DEVICE

TECHNICAL FIELD

The present invention relates to an intake control device, and more particularly to an intake control device having a valve body that adjusts the opening area of an intake manifold.

BACKGROUND ART

Patent Document 1 discloses, as an intake control device configured as described above, an intake control device that is provided with a valve body (control flap 3 in the document) that opens and closes with the rotation of a shaft (pivot shaft 9 in the document) at a position near a flange surface connected to a cylinder head in an intake manifold (inlet duct 2 in the document). As a result of the valve body being set to an open position shown in FIG. 1 or 4, the valve body is fitted within a recess portion of the intake manifold so as to maximize the opening area of the intake manifold. Also, as a result of the valve body being set to a restriction position shown in FIG. 2 or 5 by the rotation of the shaft, the valve body is displaced to a position in which the valve body rises inside the intake manifold so as to minimize the opening area.

Also, Patent Document 2 discloses a device provided with a valve body (Klappen 8 in the document) that swings about a shaft (Klappenschwenkachse 12 in the document) as in Patent Document 1. This valve body is fitted to the inner surface of the intake manifold as a result of being set to an open position shown in FIG. 6, so as to maximize the opening area of the intake manifold. Also, as a result of the valve body being set to a restriction position shown in FIG. 5, the valve body is displaced to a position in which the valve body rises inside the intake manifold so as to minimize the opening area.

Furthermore, Patent Document 3 discloses an intake control device having a configuration in which a control unit 3 is fitted at a position near a cylinder head 1 of an intake manifold 2. A valve body (control valve 41 in the document) disclosed in Patent Document 3 has the same operative configuration as that disclosed in Patent Documents 1 and 2, but is characteristic in that the control unit 3 is included in the intake manifold 2.

In other words, the intake manifold 2 includes a first member 2a that is held against the cylinder head 1 and a second member 2b that is connected to the first member 2a. The control unit 3 includes a plate-shaped valve body that is opened and closed about a pivotal axis 41 with respect to a cylindrical housing 6. With this configuration, the valve body is installed in the intake manifold 2 by fitting the housing 6 of the control unit 3 into the first member 2a and thereafter connecting the second member 2b to the first member 2a.

CITATION LIST

Patent Literature

Patent Document 1: U.S. Pat. No. 6,761,140 B2
Patent Document 2: DE 10 2009 054 184 A1
Patent Document 3: JP 2007-192147 A

SUMMARY OF INVENTION

Technical Problem

The configuration as disclosed in Patent Documents 1 and 2 in which the valve body is fitted into the intake manifold when the valve body is set in the open position flattens the inner surface of the intake manifold and reduces the resistance that acts on the air flowing through an intake passage. However, with the configuration in which the valve body is fitted into the intake manifold such that the valve body is in close contact with the recess portion of the intake manifold when the valve body is set in the open position, the accuracy is required to achieve a smooth operation, and in addition thereto, the smooth operation may be compromised if a foreign object adheres to a gap between the valve body and the recess portion. Accordingly, there is room for improvement.

In order to eliminate such a disadvantage, the gap between the valve body and the intake manifold may be increased, but if the gap is increased, the air flows into the gap when the valve body is set to the restriction position, and thus the flow of intake air cannot be appropriately restricted.

In the case where the intake manifold is made by resin molding, a configuration is also desired that can control the flow of air by disposing the valve body at an appropriate position even when the shape accuracy is low, as is also disclosed in Patent Document 3.

It is an object of the present invention to highly accurately configure an intake control device that appropriately restricts an intake air flow when a valve body is set to a restriction position while achieving a smooth operation of the valve body.

Solution to Problem

A feature of the present invention lies in an intake control device including: a sleeve fitted within an intake manifold; and a valve body switchable between an open position and a restriction position, the open position being a position in which an opening area of an intake passage in the intake manifold is maximized and the restriction position being a position in which the opening area of the intake passage is minimized, by the valve body being pivoted together with a shaft supported by the sleeve, wherein the valve body includes a main valve portion and a secondary valve portion that are positioned on one wall surface side of the sleeve with respect to the shaft when the valve body is in the open position, the main valve portion being provided downstream in an intake flow direction with respect to the shaft so as to be displaced toward the center of the sleeve and the secondary valve portion being provided upstream in the intake flow direction with respect to the shaft so as to be displaced in a direction in which it is sunk into the sleeve, when the valve body is swung from the open position to the restriction position, an accommodating space into which the secondary valve portion enters when the valve body is swung to the restriction position is formed so as to have a shape including a stepped portion that allows outward displacement from an inner surface of the sleeve, and the secondary valve portion has a seal portion that is brought closer to the stepped portion when the valve body reaches the restriction position than when the valve body is in the open position.

The valve body according to this configuration includes a main valve portion and a secondary valve portion on one side of a shaft supported by a sleeve at a position perpendicular to an intake flow direction. When the valve body is set to the open position, the main valve portion and the secondary valve portion are brought to an initial position in which they lean toward a wall surface on one side of the sleeve. When the valve body is set to the restriction position, substantially the entire area of the sleeve needs to be shielded by the main valve portion and the secondary valve portion. Accordingly, the main valve portion is formed on the downstream side in the intake flow direction with respect to the shaft, and is configured to protrude toward the center of the sleeve when the valve body is changed to the restriction position. On the other hand, the secondary valve portion is formed on the upstream side in the intake flow direction with respect to the shaft, and it needs to continuously shield a region on the wall surface side where the secondary valve portion is initially positioned with respect to the shaft even when the valve body is changed to the restriction position. Accordingly, the path of movement of the secondary valve portion is moved toward the outside of the sleeve when the valve body is changed from the initial open position to the restriction position. In order to accommodate the valve body, it is necessary to secure a certain space on the further outside of the valve body held in the open position. Accordingly, in order to create such a space, in this configuration, a stepped portion that allows outward displacement from the inner surface of the sleeve is provided.

In this configuration, in order to enhance the effect of shielding the sleeve, a seal portion is formed between the secondary valve portion and the stepped portion when the valve body is in the restriction position. The valve body according to this configuration is set alternatively to, for example, the open position and the restriction position, and when the valve body is set to the restriction position, the secondary valve portion is positioned to a fixed position. Accordingly, the seal portion is set such that the distance between the secondary valve portion and the stepped portion is small at this time. This enhances the effect of blocking the intake air flow when the valve body is in the restriction position. As a result of forming the seal portion that exhibits the effect only when the valve body is set to a predetermined position as described above, the seal portion can be simplified and made compact.

Also, according to this configuration, when the valve body is set to a position between the open position and the restriction position, a certain gap appears between the secondary valve portion and the stepped portion. The gap allows the flow of intake air to flow therethrough. Accordingly, even if a foreign object enters within the sleeve, the foreign object that tends to build up between the valve body and the wall portion of the sleeve can be effectively discharged. As a result, good operational state of the valve body can be maintained for a long period of time. As described above, according to the present invention, it is possible to highly accurately configure an intake control device that appropriately restricts the flow of intake air when the valve body is set to a restriction position while performing smooth operation of the valve body.

In the present invention, the seal portion may be constituted by a protruding portion that protrudes from a surface of the secondary valve portion so as to be closer to the stepped portion when the valve body is in the restriction position than when the valve body is in the open position.

With this configuration, because the valve body includes a protruding member, when the valve body reaches the restriction position, the protruding portion is brought closer to the stepped portion of the accommodating space, and thereby the flow of air is restricted. In other words, the seal portion can be formed without using a flexible material such as rubber that comes into contact with the valve body and the sleeve, and thus the configuration can be simplified and the production becomes easy.

In the present invention, the valve body may be configured so as to be capable of being set to an intermediate position, which is located in middle between the open position and the restriction position, and includes a secondary seal portion that is brought closer to the stepped portion when the valve body is in the intermediate position than when the valve body is in the open position.

With this configuration, when the valve body is set to the intermediate position, the secondary seal portion is brought closer to the stepped portion of the accommodating space, and thus the amount of air flowing into an area of the secondary valve portion when the valve body is in the intermediate position is restricted, and the flow of air is controlled by the opening area set by the main valve portion.

BRIEF DESCRIPTION OF DRAWINGS

FIG. 8 is a cross-sectional view showing an intake control device according to another embodiment (a).

FIG. 9 is a cross-sectional view showing an intake control device according to another embodiment (b).

DESCRIPTION OF EMBODIMENTS

Figure 1:
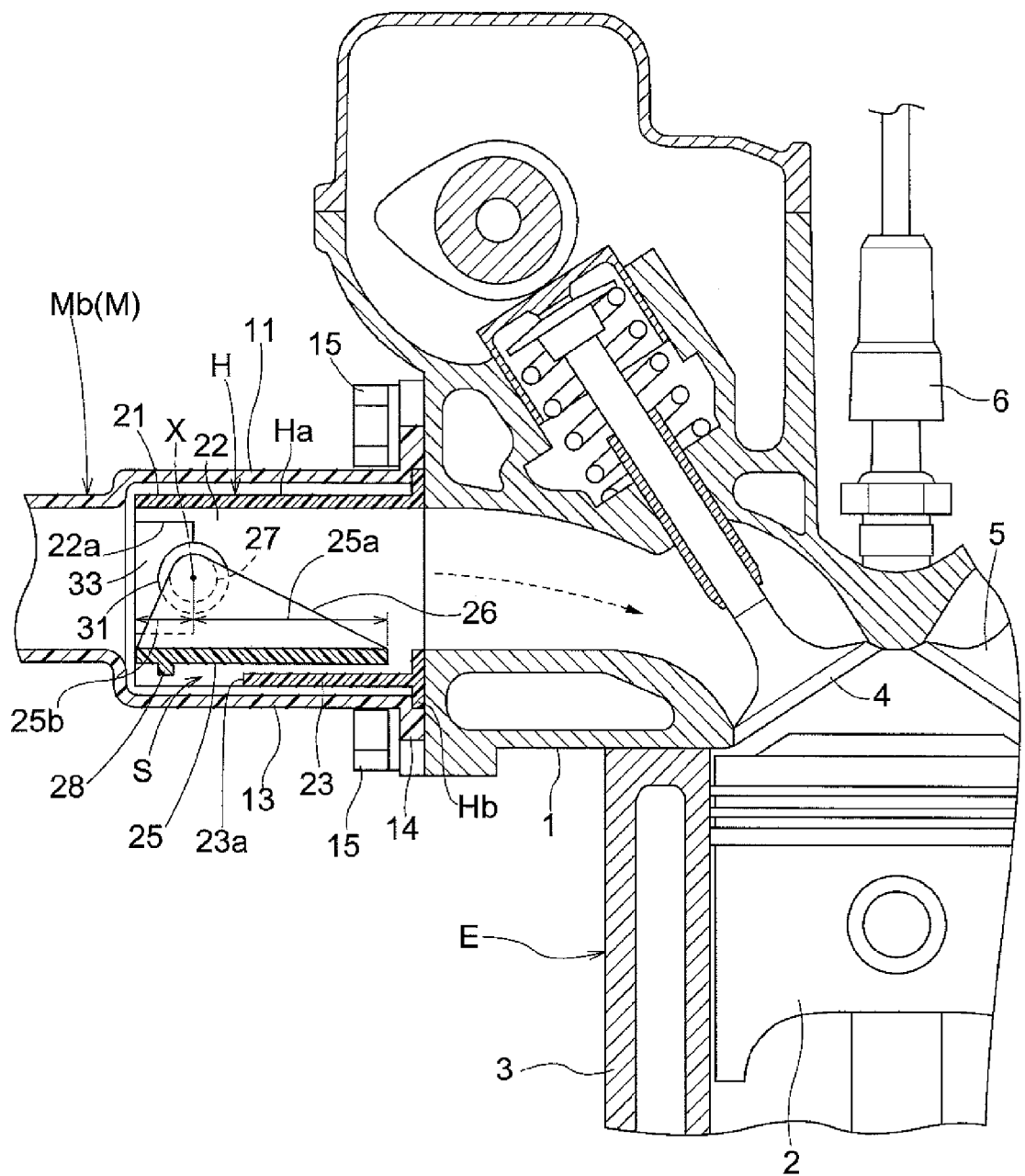
FIG. 1 is a cross-sectional view showing an upper portion of an engine and an intake control device.
Figure 2:
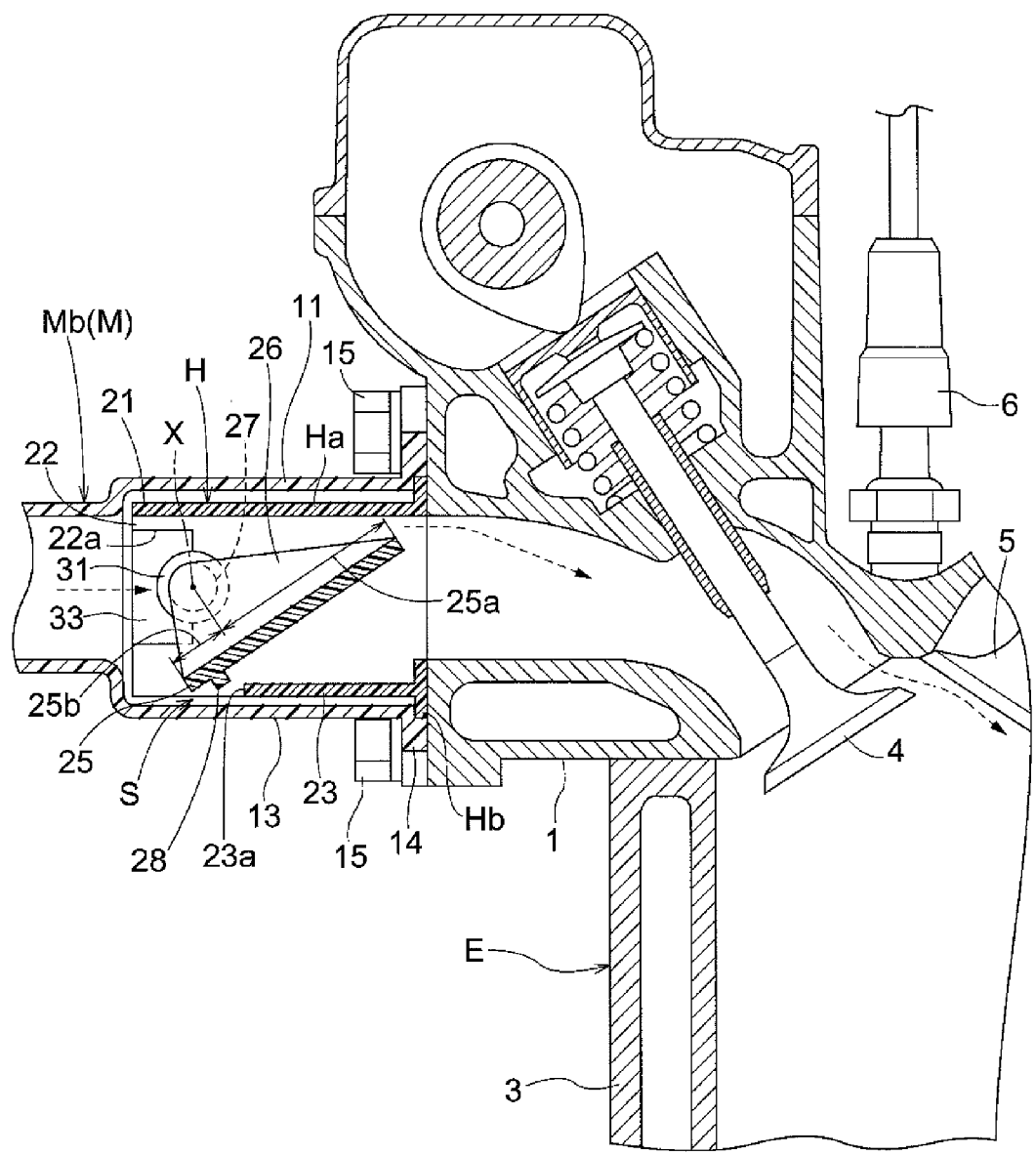
FIG. 2 is a cross-sectional view showing an intake control device in which a valve body is set to a restriction position.
Figure 3:
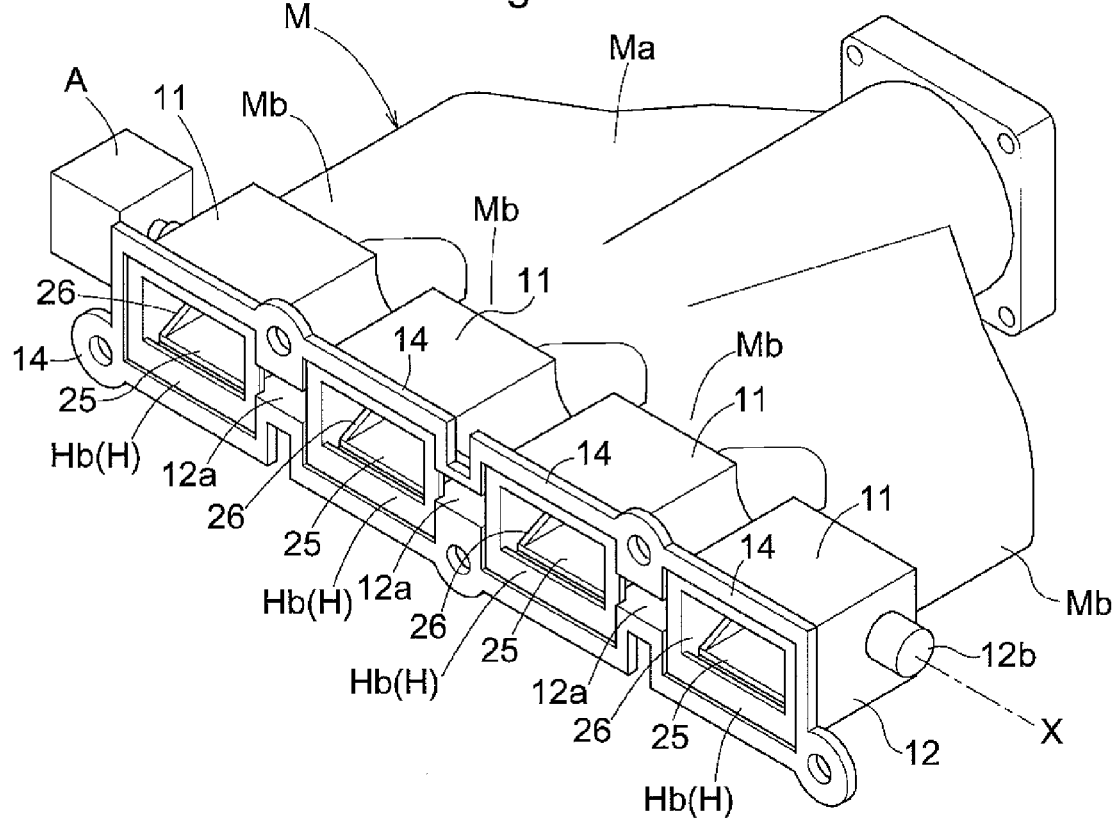
FIG. 3 is a perspective view of an intake manifold provided with an intake control device.

Hereinafter, an embodiment of the present invention will be described with reference to the drawings.
[Basic Configuration]
As shown in FIGS. 1 to 3, an intake control device includes an intake manifold M connected to a cylinder head 1 of an engine E serving as an internal combustion engine, a holder H fitted within the intake manifold M, a valve body 25 supported so as to be capable of swinging about a swing axis X with respect to the holder H, and an actuator A that sets the position of the valve body 25.

The engine E is connected to the cylinder head 1 at the upper end of a cylinder block 3 that incorporates a piston 2. The cylinder head 1 includes an intake valve 4 that supplies an intake air flow into a combustion chamber, an exhaust valve 5 that discharges a combustion gas, a spark plug 6 that ignites a mixed gas in the combustion chamber, and an injector (not shown) that supplies fuel to the combustion chamber.

The engine E has a general configuration in which the intake valve 4 is opened during an intake operation of the piston 2 so as to supply an intake air flow into the combustion chamber and supply fuel from the injector into the combustion chamber, thereafter, a compression operation is performed, then the mixed gas in the combustion chamber is ignited by the spark plug 6 to cause combustion, and an expansion force generated by the combustion is transmitted from the piston 2 to a crank shaft (not shown) so as to obtain a driving force from the crank shaft.

The intake control device functions to enhance the combustion efficiency by controlling the opening area of an intake passage of the intake manifold M when the intake air flow is supplied into the combustion chamber, so as to produce a tumble flow in the combustion chamber. In order to cause the intake control device to function as described above, the actuator A controls the position of the valve body 25 based on information obtained from an operation map based on the engine speed of the engine E and the load condition.

[Intake Control Device]

The intake manifold M is formed by integrally forming, with the use of resin, a single manifold main body Ma to which air is supplied from an air cleaner or the like and a plurality of branches Mb that separates the air coming from the manifold main body Ma into a plurality of streams so as to supply the air coming from the manifold main body Ma to respective combustion chambers in the engine E. Each branch Mb includes an upper wall portion 11, a pair of side wall portions 12 and a lower wall portion 13 at a front-end portion, and thus has a rectangular cross-section. A flange portion 14 for connecting to the cylinder head 1 is integrally formed so as to be continuous with the front-end portion of the plurality of branches Mb.

The upper wall portion 11, the pair of side wall portions 12 and the lower wall portion 13 together forms a space into which a holder H is fitted. Their relative positional relationship is set such that the inner wall of the branch Mb and the inner wall of the holder H extend linearly by expanding this area. Also, at an intermediate position between adjacent side wall portions 12, an external bearing space 12a is formed so as to communicate with the internal spaces of adjacent branches Mb and to be dented from the flange portion 14. Two side wall portions 12 provided at the outermost positions have a hollow bulged portion 12b externally bulging so as to accommodate a shaft 27.

The flange portion 14 is connected to the cylinder head 1 with bolts 15, and on the flange surface of the flange portion 14, recess portions 14a are formed within which clamping plates Hb of the holders H are fitted. Each recess portion 14a is formed so as to have a depth to which the clamping plate Hb of a holder H is fitted, and is configured such that the clamping plate Hb can be pressed against the cylinder head 1 when the flange portion 14 of the intake manifold M is connected to the cylinder head 1.

In the present embodiment, the intake control device for the 4-cylindered engine E is shown, and thus the intake manifold M includes four branches Mb so as to cope with the 4-cylindered engine E, and the valve body 25 is supported in each of the branches Mb via the holder H.

Figure 4:
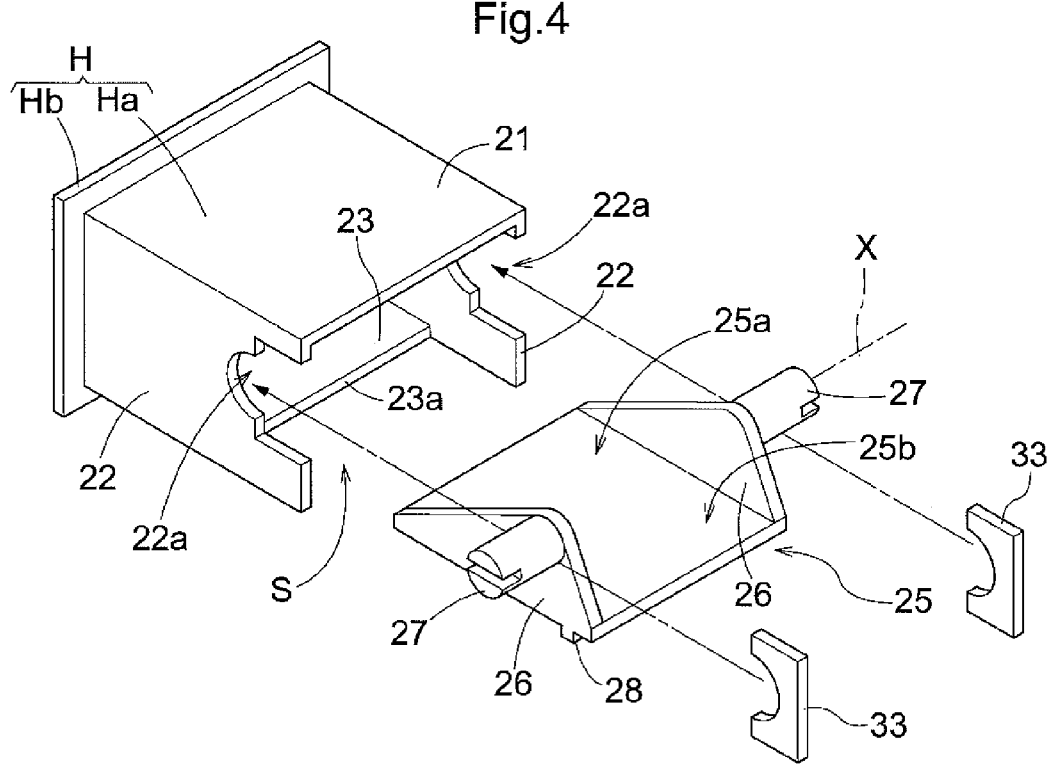
FIG. 4 is a perspective view showing a holder and a valve body.
Figure 5:
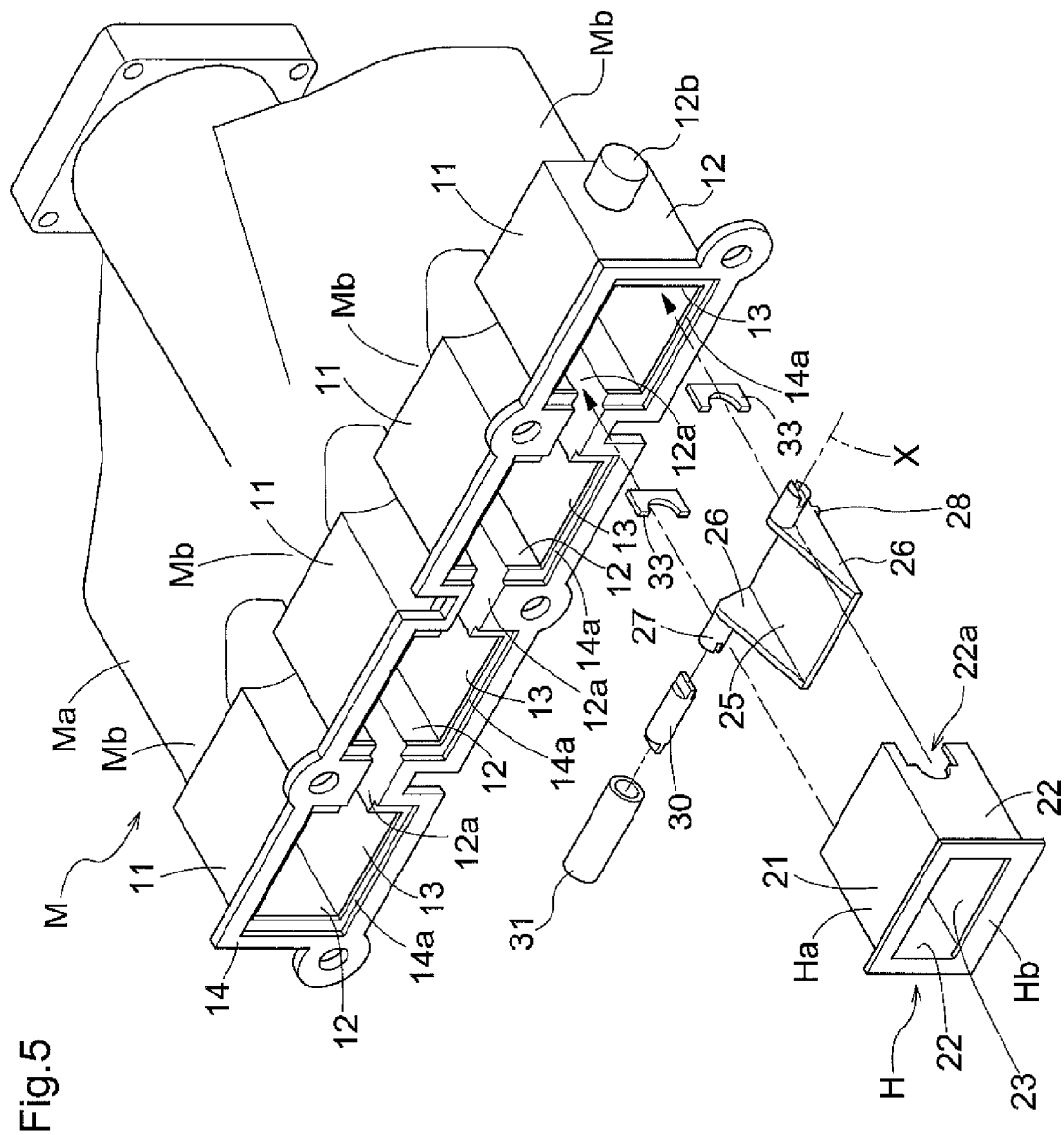
FIG. 5 is an exploded perspective view showing a manifold, a holder, and a valve body.

As shown in FIGS. 4 and 5, a holder H is formed by integrally forming, with the use of resin, a cylindrical sleeve Ha and a flange-shaped clamping plate Hb that is integrally formed with an end portion of the sleeve Ha. The sleeve Ha includes a top plate 21 disposed on the inner surface side of the upper wall portion 11 of a branch Mb of the intake manifold M, side plates 22 disposed on the inner surface side of the side wall portions 12, and a bottom plate 23 disposed on the inner surface side of the lower wall portion 13. As a result of the top plate 21, the side plates 22 and the bottom plate 23 being integrally formed, the sleeve Ha has a rectangular cross-section. Also, the top plate 21, the pair of side plates 22 and the bottom plate 23 are connected to the clamping plate Hb.

In the holder H, the top plate 21 and the pair of side plates 22 are set to have an equal dimension in the flowing direction of intake air flow, and the bottom plate 23 is set to have a shorter dimension in the flowing direction of intake air flow. Between the pair of side plates 22, an internal bearing space 22a is formed by being cut out from an end opposite to the clamping plate Hb.

In the flowing direction of intake air flow, the bottom plate 23 is set to have a dimension shorter than that of the other plates, and thereby an accommodating space S is formed in a region within the holder H where the bottom plate 23 is not present (on the upstream side of the bottom plate 23 in the intake air flow direction). The accommodating space S is formed in a region surrounded by a stepped portion 23a of the bottom plate 23, the pair of side plates 22 and the lower wall portion 13. The stepped portion 23a is formed in a shape that allows outward displacement from the inner surface of the bottom plate 23 of the holder H, and as shown in FIG. 1 and FIG. 2, the stepped portion 23a is formed at a right angle to the inner surface of the bottom plate 23.

The valve body 25 is formed so as to have a plate form, and is formed by integrally forming, with the use of resin, a pair of plate-like bracket portions 26 connected on both sides and a shaft 27 connected to the pair of bracket portions 26. The pair of bracket portions 26 are formed so as to stand upright from widthwise ends of the valve body 25, and the shaft 27 is connected to the outer surfaces of the pair of bracket portions 26.

When the valve body 25 set in an open position as shown in FIG. 1 is operated to be in a restriction position as shown in FIG. 2, a part of the valve body 25 that is lifted upward from the bottom plate 23 of the sleeve Ha and displaced toward the center of the sleeve Ha is referred to as a main valve portion 25a, and a part that is displaced in a direction in which it is sunk toward the bottom plate 23 of the sleeve Ha during this operation is referred to as a secondary valve portion 25b. The main valve portion 25a is disposed on the downstream side in the intake flow direction with respect to the shaft 27, and the secondary valve portion 25b is disposed on the upstream side in the intake flow direction.

Where a face that faces the top plate 21 while the valve body 25 is set to the open position is defined as a "surface", and the opposite face, which faces the bottom plate 23, is defined as a "back surface", on the back surface side of the secondary valve portion 25b, a protruding portion 28 is formed that serves as a seal portion that is brought closer to the stepped portion 23a of the bottom plate 23 when the valve body 25 is set to the restriction position than when the valve body 25 is set to the open position. The protruding portion 28 is formed integrally with the valve body 25, but may be fixed to the valve body 25 with the use of an adhesive, a screw, or the like.

Figure 6:
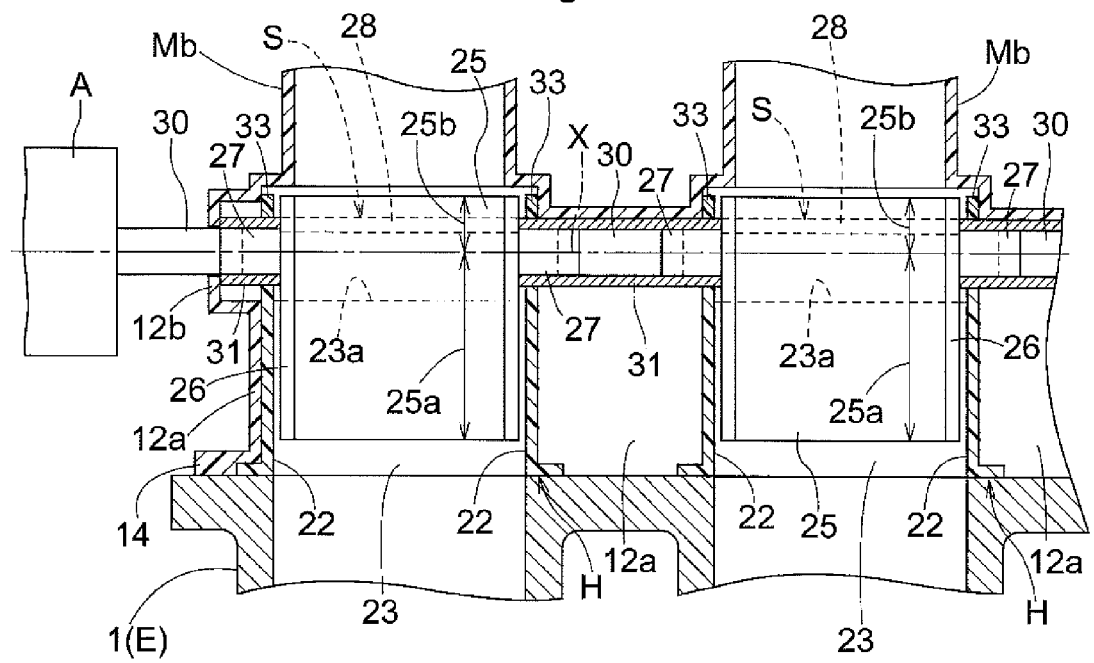
FIG. 6 is a cross-sectional view showing an arrangement of a holder and a valve body.
Figure 7:
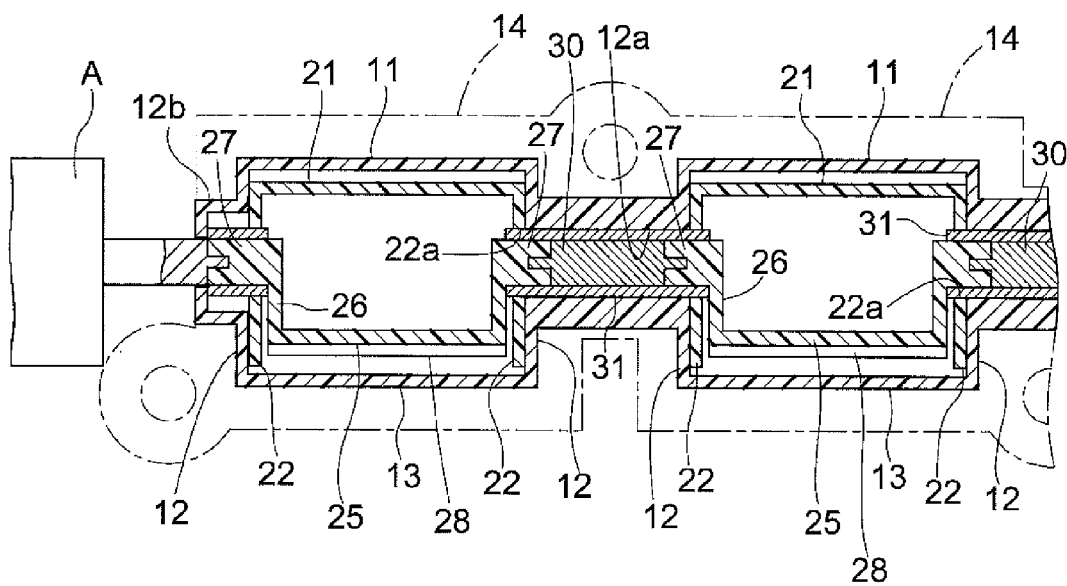
FIG. 7 is a vertical cross-sectional view showing an arrangement of a holder and a valve body.

As shown in FIGS. 5 to 7, a bearing body 30 is externally fitted to the shafts 27 of a plurality of valve bodies 25 in a rotatable manner, and adjacently disposed shafts 27 are connected with a rod-like joint 31. As shown in FIGS. 3 to 5, the inner ends of the external bearing space 12a (the end on the upstream side in the intake air flow direction) and the inner ends of the internal bearing space 22a (the end on the downstream side in the intake air flow direction) are shaped in a semicircle, and when the sleeve Ha is inserted into the branch Mb, the semicircles formed in the inner ends of the external bearing space 12a and the internal bearing space 22a are combined to form a circular hole.

The internal bearing space 22a has the aforementioned semicircular part at an end position of a slit portion having a width larger than the diameter of the shaft 27, and a seal plate 33 is provided to fit into the slit portion of the internal bearing space 22a. A part at an end of the seal plate 33 that comes into contact with the shaft 27 is formed so as to have a semicircular recess. With this configuration, the semicircular recess of the internal bearing space 22a and the semicircular recess formed in the seal plate 33 together form a circular hole. By disposing the bearing body 30 in a hole-shaped part formed by two semicircular recesses as described above, the shaft 27 is supported so as to be capable of rotation about the swing axis X.

In the case of assembling the intake control device, the shafts 27 of the valve bodies 25 are connected with the joint 31, and then inserted into the internal bearing space 22a of the side plates 22 of the holders H. In the case where the shaft 27 is accommodated into the branches Mb, one end of the shaft 27 is accommodated in a bulged portion 12b, and the other end is accommodated in another bulged portion 12b. Also, the other end of the shaft 27 is connected to an output shaft of the actuator A. Furthermore, by the seal plates 33 being fitted into the slit portions of the internal bearing spaces 22a, the bearing body 30 is sandwiched by the semicircular recess of the internal bearing space 22a and the semicircular recess at the inner end of the seal plate 33. In this state, the holders H and the valve bodies 25 are set inside the branches Mb, and the branches Mb are connected to the cylinder head 1 by using bolts 15.

In the intake control device assembled in the manner described above, each holder H is fitted in the corresponding branch Mb, and the clamping plate Hb of the holder H is clamped between the flange portion 14 and the cylinder head 1 at the recess portion 14a provided in the flange portion 14 of the branch Mb.

The bearing body 30 has an engaging projection at each end of the rod-like member. By forming, at an end of the shaft 27, an engaging recess portion into which the engaging projection is fitted, a state can be achieved in which a plurality of valve bodies 25 are swung together about the swing axis X. Also, by connecting the output shaft of the actuator A to one end of the shaft 27, the position of the valve body 25 can be switched by the driving force of the actuator A.

[Operative Configuration]

When the valve body 25 is set to the open position shown in FIG. 1 by the operation of the actuator A, the valve body 25 is located along the bottom plate 23 (a specific example of one side of the sleeve Ha), and takes a position in which the valve body 25 is parallel to the bottom plate 23, whereby the opening area of the intake passage of the branch Mb of the intake manifold M is maximized. Also, when the valve body 25 is set to the restriction position shown in FIG. 2 by the shaft 27 pivoting about the swing axis X by the operation of the actuator A in the reverse direction, the main valve portion 25a is moved so as to rise from the bottom plate 23, and the secondary valve portion 25b enters the accommodating space S.

As described above, when the valve body 25 reaches the restriction position, the main valve portion 25a minimizes the opening area of the intake passage, and by the protruding portion 28 serving as a seal portion being brought closer to the stepped portion 23a of the bottom plate 23, the flow of air in this area is restricted.

[Effects of Embodiment]

As described above, in the intake control device of the present invention, when the valve body 25 is switched from the open position to the restriction position, the secondary valve portion 25b of the valve body 25 is sunk into the accommodating space S. In the case where the accommodating space S is formed so as to have a circular arc shape extending along the path of operation of the secondary valve portion 25b, a foreign object contained in the intake air flow may adhere thereto to compromise a smooth operation, but because the accommodating space S is formed by partially cutting out the bottom plate 23, smooth operation of the valve body 25 is achieved in the intake control device of the present invention.

Particularly, as a result of forming, in the secondary valve portion 25b, the protruding portion 28 that is brought closer to the stepped portion 23a in the accommodating space S when the valve body 25 is set to the restriction position, it is possible to eliminate the disadvantage of the air flowing into the gap between the secondary valve portion 25b and the accommodating space S, without compromising the smooth operation of the valve body 25.

Also, because the valve body 25 is supported so as to be capable of swinging via the shaft 27 with respect to the sleeve Ha of the holder H, in a state in which the holder H is fitted into the branch Mb of the intake manifold M, the valve body 25 can be supported with high accuracy with respect to the inside of the branch Mb via the sleeve Ha, and thus the intake air flow is suitably restricted when the valve body 25 is set to the restriction position.

[Other Embodiments]

Besides the embodiment described above, the present invention may be configured as follows.

(a) As shown in FIG. 8, the intake control device of the present invention may be configured such that the valve body 25 is set to the open position, the restriction position and an intermediate position that is located in the middle of the two positions, and a secondary protruding portion 29 may be provided on the back surface of the valve body 25 so as to cope with the intermediate position. In this configuration, when the valve body 25 is set to the restriction position, as shown in the upper part of FIG. 8, the protruding portion 28 is brought closer to the stepped portion 23a of the accommodating space S so as to restrict the flow of intake air in this area, as in the embodiment described above. When the valve body 25 is set to the intermediate position, as shown in the lower part of FIG. 8, the secondary protruding portion 29 is brought closer to the stepped portion 23a of the accommodating space S so as to restrict the flow of intake air in this area.

In this way, when a plurality of seal portions (the protruding portion 28 and the secondary protruding portion 29) are formed, regardless of whether the valve body 25 is set to the restriction position or the intermediate position, the disadvantage of the intake air flow flowing via the accommodating space S can be restricted, and an appropriate tumble flow can be made by the valve body 25.

In particular, the present invention may be configured such that the valve body 25 is set to the restriction position, the intermediate position, and other positions, and three or more seal portions may be formed as seal portions so as to cope with these positions.

(b) As shown in FIG. 9, the accommodating space S may be formed so as to have a stepped portion 23a having a smooth circular arc shape at an end in the intake air flow direction by removing the inner surface side of the bottom plate 23. In this way, by forming the accommodating space S on the inner surface side of the holder H, a higher strength can be obtained as compared to the configuration in which the accommodating space S is formed by partially cutting out the bottom plate 23 as in the embodiment described above.

(c) The cross sections of the branch Mb and the sleeve Ha are not limited to a rectangular shape, and they may have, for example, an oval or elliptic cross section.

INDUSTRIAL APPLICABILITY

The present invention is applicable to an intake manifold provided with a valve body that controls the opening area of an intake passage.

REFERENCE SIGNS LIST

23a Stepped Portion
25 Valve Body
25a Main Valve Portion
25b Secondary Valve Portion
27 Shaft
28 Seal Portion (Protruding Portion)
29 Secondary Seal Portion (Secondary Protruding Portion)
Ha Sleeve
M Intake Manifold
S Accommodating Space

The invention claimed is:

1. An intake control device comprising:
a sleeve fitted within an intake manifold; and
a valve body switchable between an open position and a restriction position, the open position being a position in which an opening area of an intake passage in the intake manifold is maximized by the sleeve and the restriction position being a position in which the opening area of the intake passage is minimized, by the valve body being pivoted together with a shaft supported,
wherein the valve body includes a main valve portion and a secondary valve portion that are positioned on one wall surface side of the sleeve with respect to the shaft when the valve body is in the open position, the main valve portion being provided downstream in an intake flow direction with respect to the shaft so as to be displaced toward the center of the sleeve and the secondary valve portion being provided upstream in the intake flow direction with respect to the shaft so as to be displaced in a direction in which it is sunk into the sleeve, when the valve body is swung from the open position to the restriction position,
an accommodating space into which the secondary valve portion enters when the valve body is swung to the restriction position is formed so as to have a shape including a stepped portion that allows outward displacement from an inner surface of the sleeve, and
the secondary valve portion has a seal portion that is brought closer to the stepped portion when the valve body reaches the restriction position than when the valve body is in the open position.

2. The intake control device according to claim 1,
wherein the seal portion is constituted by a protruding portion that protrudes from a surface of the secondary valve portion so as to be closer to the stepped portion when the valve body is in the restriction position than when the valve body is in the open position.

3. The intake control device according to claim 2,
wherein the protruding portion protrudes linearly from a surface of the secondary valve portion.

4. The intake control device according to claim 1,
wherein the valve body is configured so as to be capable of being set to an intermediate position, which is located in middle between the open position and the restriction position, and includes a secondary seal portion that is brought closer to the stepped portion when the valve body is in the intermediate position than when the valve body is in the open position.

5. The intake control device according to claim 1,
wherein the accommodating space is formed by cutting out the one wall surface.

* * * * *